Oct. 6, 1970 J. E. MILLER 3,531,877
RATIO AND PROPORTION DEMONSTRATING DEVICE
Filed April 19, 1968

INVENTOR
John Everett Miller

Oct. 6, 1970 J. E. MILLER 3,531,877
RATIO AND PROPORTION DEMONSTRATING DEVICE
Filed April 19, 1968 3 Sheets-Sheet 3

INVENTOR
John Everett Miller

United States Patent Office 3,531,877
Patented Oct. 6, 1970

3,531,877
RATIO AND PROPORTION DEMONSTRATING DEVICE
John Everett Miller, 4568 E. 45th St.,
Tulsa, Okla. 74135
Filed Apr. 19, 1968, Ser. No. 729,482
Int. Cl. G09b 23/02
U.S. Cl. 35—30                                2 Claims

ABSTRACT OF THE DISCLOSURE

This invention relates to a simple mechanical teaching device used to demonstrate certain properties of proportions—a proportion being an equation where one ratio is equal to another. Four flat numbered or lettered blocks hang freely on a panel-like support in such a way that their number symbols and other symbols on the device form a proportion. Each block is held by a pin near the top of the block. Gravity keeps the symbols in an upright position as the device is rotated vertically. The device, is rotated 90° at a time to demonstrate that if $$\frac{a}{b}=\frac{c}{d}, \text{ then } \frac{b}{d}=\frac{a}{c} \text{ and } \frac{d}{c}=\frac{b}{a} \text{ and } \frac{c}{a}=\frac{d}{b}$$

when $a$, $b$, $c$, and $d$ represent any numbers other than zero.

---

The principal object of the invention is to help students of mathematics understand certain properties of ratios and proportions and thus to translate verbal problems to proportions. The following is a specific example: If 2 candy mints cost 4 cents, at an equal price 3 mints cost 6 cents, may be translated $$\frac{2}{4}=\frac{3}{6}$$

In the proportion any pair of numbers in the same row or column are related in a particular way. The 2 and 3 are the numbers of mints, 4 and 6 are the numbers of cents, 2 and 4 are numbers used in a small purchase, and 3 and 6 are numbers used in a larger purchase. When these numbers are used in a proportion with the invention and rotated 90° at a time, it is demonstrated that four different proportions may represent the same mathematical situation and in each case each pair of numbers is related in the same way as before.

Another object of the invention is to demonstrate properties of equivalent common fractions.

Figure 1:
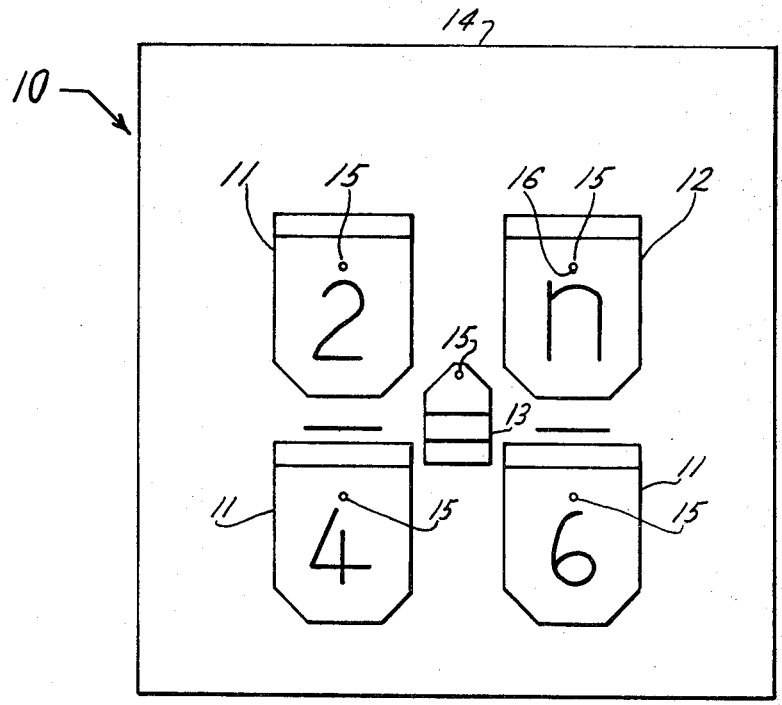
FIG. 1 is a front elevation of the preferred form of a ratio and proportion demonstrating device in accordance with my invention.
Figures 2, 3, 4, 5:
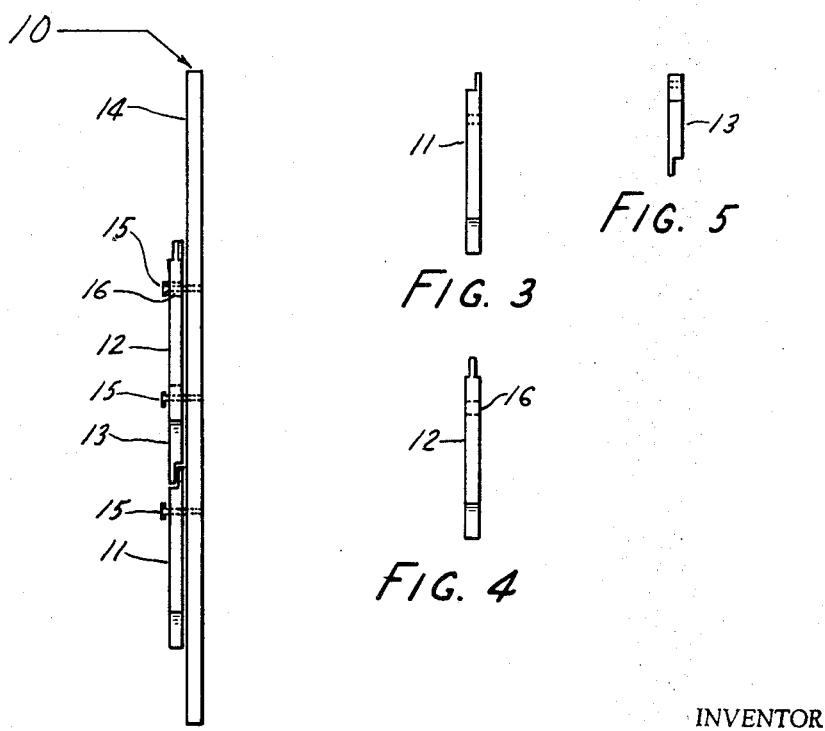
FIG. 2 is a side elevation.
FIG. 3 is a side elevation of a block numbered or lettered on one side.
FIG. 4 is a side elevation of a block numbered or lettered on both sides.
FIG. 5 is a side elevation of a block on which there is an equal sign.
Figure 6:
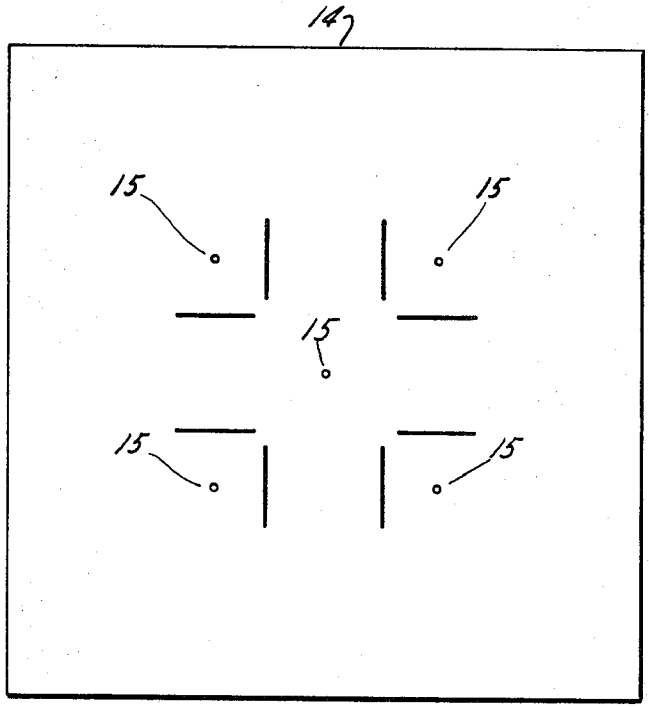
FIG. 6 is a panel-like support on which the blocks are held.

The device 10 of the invention in the specific form illustrated, makes use of four numbered or lettered flat blocks 11, 12, and one flat block 13 labeled or marked with an equal sign, each block hanging freely from a panel-like support 14 by a single pin 15 per block. Numbered blocks 11, 12 are notched at the top and the block 13 with the equal sign is notched at the bottom as shown in FIGS. 1, 2, 3, 4, and 5. The blocks are notched in such a manner that they may change position without obstructing the movement of each other as the device 10 is rotated in a vertical plane. Blocks 11, 12, 13 are made of a material heavy enough that gravity will hold them in an upright position as the device 10 is rotated—each block 11, 12, 13, being held by a single pin 15 which is located well above the center of gravity of the block 11, 12, 13. The block 12 which is numbered or lettered on both sides has a hole 16 large enough for the head of the pin 15 to pass through allowing the block to be turned over so that either of the two faces may be used. The panel-like support 14 is approximately square and is labeled or marked with eight fraction lines which are located in such positions that only two are exposed at a time when the device 10 is in use. The device 10 is rotated vertically coming to rest in four different positions to show four different but related proportions. The device 10 shown in FIGS. 1, 2, 3, 4, 5, and 6 is the preferred form of the invention.

Figure 7:
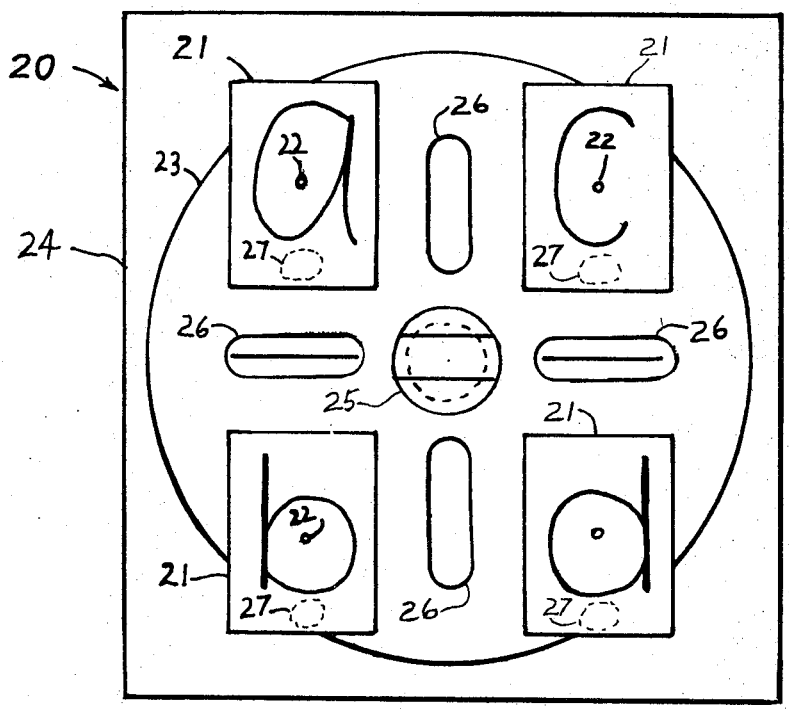
FIG. 7 is a front elevation of another form of the invention.
Figures 8, 9:
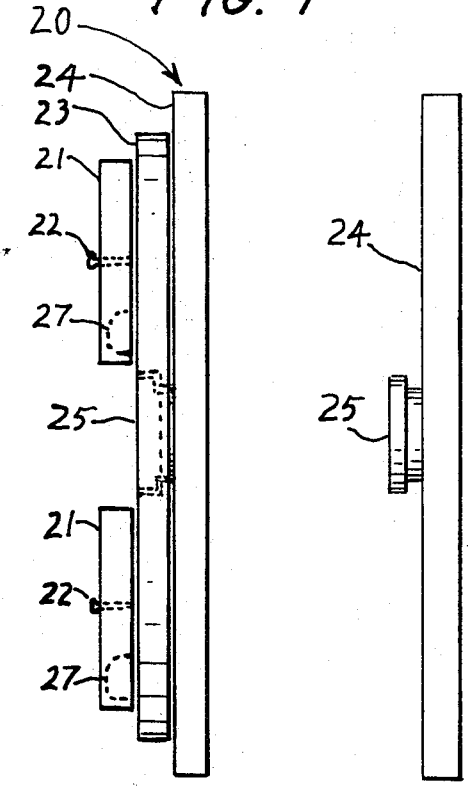
FIG. 8 is a side elevation of this form.
FIG. 9 is a side elevation of a panel-like support and hub which is used to hold another member which rotates around the hub.

The device 20, a variation of the invention, is illustrated in FIGS. 7, 8, and 9 and makes use of four flat numbered or lettered blocks 21 each hung freely by a single pin 22 to a flat rotating member 23 which is held on a panel-like support 24 by a hub 25. The member 23 rotates freely around hub 25. A pair of fraction lines on the support 24 can be seen through two of four openings 26 in the rotating member 23. Imbedded weights 27 near the bottom of each numbered block 21 cause gravity to keep the blocks in an upright position as the member 23 is rotated vertically. An equal sign is labeled or painted on the hub 25. When the device 20 is held in a vertical plane and the disk-like member is rotated 90° at a time four different but related proportions are demonstrated.

I claim:

1. A ratio and proportion demonstrating device comprising; a panel-like support adapted to be rotated vertically; first, second, third and fourth blocks pivotally mounted on said support above their center of gravity in an array of two rows and two columns, said blocks bearing mathematical indicia thereon; and
    markings on said support between the rows and columns to indicate mathematical ratios and proportions in association with the indicia on said blocks;
    whereby when said support is rotated vertically through 360° said blocks are carried on said support and remain in an upright readable position to form a different but related proportion in each of four different positions of the support.

2. A ratio and proportion demonstrating device comprising;
    a vertically positioned panel-like support;
    a flat member rotatably mounted on said support;
    first, second, third and fourth blocks pivotally mounted on said member in an array of two rows and two columns, said blocks bearing mathematical indicia thereon and being weighted to remain in an upright readable position;

markings on said support between the rows and columns to indicate mathematical ratios and proportions in association with the indicia on said blocks; and aperture means in said flat member to permit certain of said markings to be viewed upon the rotation of said flat member through a 90° increment;

whereby when said member is rotated vertically through 360° said blocks are carried on said member and remain in an upright readable position to form a different but related proportion in each of four different positions of the member.

References Cited

UNITED STATES PATENTS

| | | | |
|---|---|---|---|
| 489,027 | 1/1893 | McDonald | 40—34 |
| 1,270,668 | 6/1918 | Spoor et al. | 35—74 |

WILLIAM H. GRIEB, Primary Examiner